(12) United States Patent
Lee et al.

(10) Patent No.: US 12,548,527 B2
(45) Date of Patent: Feb. 10, 2026

(54) ELECTRONIC DEVICE AND METHOD FOR ADJUSTING LUMINANCE OF DISPLAY ON BASIS OF ANGLE FORMED WITH EARBUD, AND NON-TRANSITORY COMPUTER-READABLE STORAGE MEDIUM

(71) Applicant: SAMSUNG ELECTRONICS CO., LTD., Suwon-si (KR)

(72) Inventors: Jeock Lee, Suwon-si (KR); Jonghwan Kim, Suwon-si (KR); Jinyong Kim, Suwon-si (KR); Taiyong Kim, Suwon-si (KR); Yonghoon Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 90 days.

(21) Appl. No.: 18/652,439

(22) Filed: May 1, 2024

(65) Prior Publication Data

US 2024/0282271 A1 Aug. 22, 2024

Related U.S. Application Data

(63) Continuation of application No. PCT/KR2022/017438, filed on Nov. 8, 2022.

(30) Foreign Application Priority Data

Nov. 9, 2021 (KR) .................. 10-2021-0153048
Dec. 24, 2021 (KR) .................. 10-2021-0187832

(51) Int. Cl.
*G09G 5/10* (2006.01)
*G09G 3/34* (2006.01)
*H04R 1/10* (2006.01)

(52) U.S. Cl.
CPC ......... *G09G 3/3406* (2013.01); *H04R 1/1016* (2013.01); *H04R 1/1041* (2013.01);
(Continued)

(58) Field of Classification Search
CPC ... G09G 3/3406; H04R 1/1016; H04R 1/1041
(Continued)

(56) References Cited

U.S. PATENT DOCUMENTS 9,326,058 B2   4/2016  Tachibana et al.
9,456,265 B2   9/2016  Park et al.
(Continued)

FOREIGN PATENT DOCUMENTS

CN   109257506 A   1/2019
CN   210609637 U   5/2020
(Continued)

OTHER PUBLICATIONS

Communication issued Apr. 1, 2025 by the Korean Intellectual Property Office in Korean Patent Application No. 10-2021-0187832.
(Continued)

*Primary Examiner* — Jonathan M Blancha
(74) *Attorney, Agent, or Firm* — Sughrue Mion, PLLC

(57) ABSTRACT

An electronic device includes: at least one memory storing instructions; at least one sensor; a display; a communication circuitry; and at least one processor operatively connected to the at least one memory, the at least one sensor, the display, and the communication circuitry, wherein the at least one processor is configured to execute the instructions to: receive a touch input contacted on the display; identify that a variance of a posture of the electronic device is lower than a threshold value; transmit, to one earbud through the communication circuitry, a signal to request second data about a posture of the at least one earbud; receive the second (Continued)

data; obtain a reference angle; identify a difference between third data about the posture of the electronic device, display a screen, through the display, with a first brightness or display the screen with a second brightness different from the first brightness.

20 Claims, 10 Drawing Sheets

(52) U.S. Cl.
CPC . *G09G 2320/103* (2013.01); *G09G 2320/106* (2013.01); *H04R 2420/07* (2013.01); *H04R 2460/07* (2013.01); *H04R 2460/17* (2013.01)

(58) Field of Classification Search
USPC .......................................................... 345/690
See application file for complete search history.

(56) References Cited

U.S. PATENT DOCUMENTS

| | | | |
|---|---|---|---|
| 10,067,561 | B2 | 9/2018 | San Agustin Lopez |
| 10,216,266 | B2 | 2/2019 | Krulce et al. |
| 10,291,975 | B2 | 5/2019 | Howell et al. |
| 10,415,976 | B2 | 9/2019 | Ou et al. |
| 10,785,472 | B2 | 9/2020 | Kobayashi |
| 11,354,035 | B2 | 6/2022 | Oh et al. |
| 2003/0202005 | A1 | 10/2003 | Sadahiro |
| 2012/0114132 | A1 | 5/2012 | Abrahamsson et al. |
| 2016/0124569 | A1 | 5/2016 | Sunwoo et al. |
| 2018/0018142 | A1 | 1/2018 | Kim et al. |
| 2018/0124496 | A1* | 5/2018 | Tachibana ............ H04R 1/1041 |
| 2019/0342651 | A1 | 11/2019 | Howell et al. |
| 2021/0405395 | A1* | 12/2021 | Li .......................... G02C 11/10 |
| 2023/0165538 | A1* | 6/2023 | Nematihosseinabadi .................... G16H 50/80 600/529 |
| 2023/0251822 | A1* | 8/2023 | Watson ................... G06F 3/165 381/74 |
| 2024/0114295 | A1* | 4/2024 | Hu ....................... H04R 25/305 |

FOREIGN PATENT DOCUMENTS

| | | |
|---|---|---|
| CN | 112286429 A | 1/2021 |
| CN | 111522525 B | 8/2023 |
| JP | 2003-317455 A | 11/2003 |
| JP | 2011-150631 A | 8/2011 |
| KR | 10-1183737 B1 | 9/2012 |
| KR | 10-2014-0079214 A | 6/2014 |
| KR | 10-2015-0028067 A | 3/2015 |
| KR | 10-2016-0053685 A | 5/2016 |
| KR | 10-2017-0058395 A | 5/2017 |
| KR | 10-2021-0047613 A | 4/2021 |
| KR | 10-2268552 B1 | 6/2021 |
| WO | 2021/149840 A1 | 7/2021 |

OTHER PUBLICATIONS

International Search Report (PCT/ISA/210) issued by the International Searching Authority on Feb. 10, 2023 in International Application No. PCT/KR2022/017438.

Written Opinion (PCT/ISA/237) issued by the International Searching Authority on Feb. 10, 2023 in International Application No. PCT/KR2022/017438.

Communication issued Nov. 20, 2025 by the Korean Intellectual Property Office in Korean Patent Application No. 10-2021-0187832.

* cited by examiner

ELECTRONIC DEVICE AND METHOD FOR ADJUSTING LUMINANCE OF DISPLAY ON BASIS OF ANGLE FORMED WITH EARBUD, AND NON-TRANSITORY COMPUTER-READABLE STORAGE MEDIUM

CROSS-REFERENCE TO RELATED APPLICATIONS

This application is a by-pass continuation application of International Application No. PCT/KR2022/017438, filed on Nov. 8, 2022, which is based on and claims priority to Korean Patent Application Nos. 10-2021-0153048, filed on Nov. 9, 2021, and 10-2021-0187832, filed on Dec. 24, 2021, in the Korean Intellectual Property Office, the disclosures of which are incorporated by reference herein their entireties.

BACKGROUND

1. Field

The disclosure relates to an electronic device and a method for adjusting luminance of a display on basis of an angle formed with earbuds, and a non-transitory computer-readable storage medium.

2. Description of Related Art

With development of digital technology, various types of an electronic devices such as a mobile communication terminal, a smart phone, a tablet personal computer (PC), a notebook, a personal digital assistant (PDA), a wearable device, a digital camera, or a personal computer is widely used.

The electronic device may communicate with an external electronic device through wireless communication in addition to wired communication. For example, the electronic device may input and/or output an audio signal related to function performance of the electronic device through the external electronic device, by wirelessly connecting to the external electronic device (e.g., a Bluetooth speaker, Bluetooth earbuds, a Bluetooth hands-free earphone, and the like) through Bluetooth communication.

SUMMARY

According to an embodiment, an electronic device includes: at least one memory storing instructions; at least one sensor; a display; a communication circuitry; and at least one processor operatively connected to the at least one memory, the at least one sensor, the display, and the communication circuitry, wherein the at least one processor is configured to execute the instructions to: when identifying whether at least one earbud is worn based on a preset signal received from the at least one earbud connected to the electronic device, receive a touch input contacted on the display; based on first data obtained through the at least one sensor when the touch input is received, identify that a variance of a posture of the electronic device is lower than a threshold value; based on identifying that the variance of the posture of the electronic device is lower than the threshold value when the touch input is received, transmit, to the at least one earbud through the communication circuitry, a signal to request second data about a posture of the at least one earbud; receive, from the at least one earbud through the communication circuitry, the second data; obtain a reference angle indicating a difference of the posture of the electronic device and the posture of the at least one earbud, based on a difference of the first data about the posture of the electronic device and the second data about the posture of the at least one earbud when the touch input is received; after obtaining the reference angle, identify a difference between third data about the posture of the electronic device, the third data being obtained through the at least one sensor, and fourth data about the posture of the at least one earbud received from the at least one earbud through the communication circuitry; based on identifying that the difference between the third data and the fourth data is within a preset range from the reference angle, display a screen, through the display, with a first brightness; and based on identifying that the difference between the third data and the fourth data is outside of the preset range, display the screen with a second brightness different from the first brightness.

The at least one sensor may include at least one of an acceleration sensor, a gyro sensor, and a geomagnetic sensor.

The at least one processor may be further configured to execute the instructions to: identify a strength of a signal comprising the fourth data; identify that the strength of the identified signal is lower than a preset threshold value; based on identifying that the strength of the identified signal is lower than the preset threshold value and based on identifying that the difference between the third data and the fourth data is within the preset range from the reference angle, bypass displaying the screen, which is displayed through the display, with the first brightness, and display the screen with the second brightness lower than the first brightness.

The at least one processor may be further configured to execute the instructions to: identify that a preset time is elapsed from a time instance identifying that the strength of the identified signal is lower than the preset threshold value; based on identifying that a preset time is elapsed, turn off the display and set the electronic device as a lock state.

The at least one processor may be further configured to execute the instructions to: identify that a preset time is elapsed from a time instance displaying the screen with the second brightness lower than the first brightness; based on identifying that a preset time is elapsed, turn off the display and set the electronic device as a lock state.

The at least one processor may be further configured to execute the instructions to: after obtaining the reference angle, identify that the touch input contacted on the display is received; based on identifying that the touch input is received, calibrate the reference angle based on the first data obtained through the at least one sensor when the touch input is received and the second data about the posture of the at least one earbud.

The at least one processor may be further configured to execute the instructions to: identify that at least one application, that is being set to display the screen, which is displayed through the display, with the first brightness, is executed; based on identifying that the at least one application is executed, bypass a calibration of the reference angle.

The at least one processor may be further configured to execute the instructions to: when a variance of the posture of the electronic device exceeds the threshold value, based on the first data, identify that a page orientation of the electronic device is changed.

The page orientation may correspond to at least one of a landscape mode and a portrait mode.

The at least one processor may be further configured to execute the instructions to: based on identifying that the page orientation is changed, transmit, to the at least one earbud through the communication circuitry, a signal to request second data about the posture of the at least one earbud.

According to an aspect of the disclosure, an operation method of an electronic device including at least one memory configured to store instructions, at least one processor, at least one sensor, a display and a communication circuitry, includes: when identifying whether at least one earbud is worn based on a preset signal received from the at least one earbud connected to the electronic device, receiving a touch input contacted on the display; based on first data obtained through the at least one sensor when the touch input is received, identifying that a variance of a posture of the electronic device is lower than a threshold value; based on identifying that the variance of the posture of the electronic device is lower than the threshold value when the touch input is received, transmitting, to the at least one earbud through the communication circuitry, a signal to request second data about a posture of the at least one earbud; receiving, through the communication circuitry from the at least one earbud, the second data; obtaining a reference angle indicating a difference of the posture of the electronic device and the posture of the at least one earbud, based on a difference of the first data about the posture of the electronic device and the second data about the posture of the at least one earbud when the touch input is received; after obtaining the reference angle, identifying a difference between third data about the posture of the electronic device, the third data being obtained through the at least one sensor, and fourth data about the posture of the at least one earbud received from the at least one earbud through the communication circuitry; based on identifying that the difference between the third data and the fourth data is within a preset range from the reference angle, displaying a screen, that is displayed through the display, with a first brightness; based on identifying that the difference between the third data and the fourth data is outside of the preset range, displaying the screen with a second brightness different from the first brightness.

The at least one sensor may include at least one of an acceleration sensor, a gyro sensor, and a geomagnetic sensor.

The method may further include: identifying a strength of a signal comprising the fourth data; identifying that the strength of the identified signal is lower than a preset threshold value; when the strength of the identified signal is lower than the preset threshold value, based on identifying that the difference between the third data and the fourth data is within the preset range from the reference angle, bypassing displaying the screen, which is displayed through the display, with the first brightness, and displaying the screen with the second brightness lower than the first brightness.

The method may further include: identifying that a preset time is elapsed from a time instance identifying that the strength of the identified signal is lower than the preset threshold value; based on identifying that a preset time is elapsed, turning off the display and setting the electronic device as a lock state.

The method may further include: identifying that a preset time is elapsed from a time instance displaying the screen with the second brightness lower than the first brightness; based on identifying that a preset time is elapsed, turning off the display and setting the electronic device as a lock state.

The method may further include: after obtaining the reference angle, identifying that the touch input contacted on the display is received; based on identifying that the touch input is received, calibrating the reference angle based on the first data obtained through the at least one sensor when the touch input is received and the second data about the posture of the at least one earbud.

The method may further include: identifying that at least one application, that is being set to display the screen, which is displayed through the display, with the first brightness, is executed; based on identifying that the at least one application is executed, bypassing a calibration of the reference angle.

The method may further include: when a variance of the posture of the electronic device exceeds the threshold value, based on the first data, identifying that a page orientation of the electronic device is changed.

The page orientation may be corresponding to one of a landscape mode and a portrait mode.

The method may further include: based on identifying that the page orientation is changed, transmitting, to the at least one earbud through the communication circuitry, a signal to request second data about the posture of the at least one earbud.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
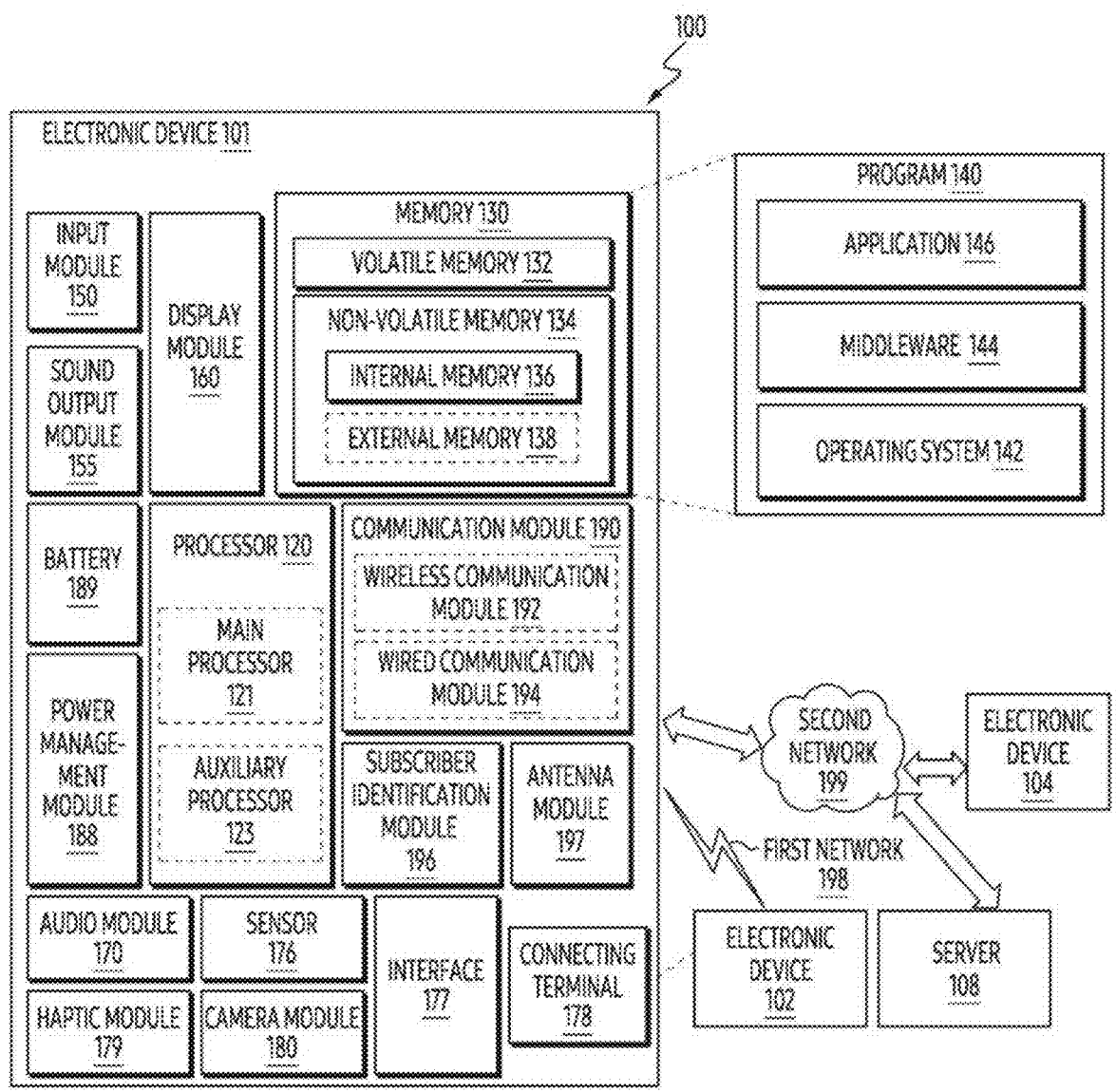
FIG. 1 is a block diagram of an electronic device in a network environment according to one or more embodiments.

The terms as used in the disclosure are provided to merely describe specific embodiments, not intended to limit the scope of other embodiments. Singular forms include plural referents unless the context clearly dictates otherwise. The terms and words as used herein, including technical or scientific terms, may have the same meanings as generally understood by those skilled in the art. The terms as generally defined in dictionaries may be interpreted as having the same or similar meanings as or to contextual meanings of the relevant art. Unless otherwise defined, the terms should not be interpreted as ideally or excessively formal meanings.

Even though a term is defined in the disclosure, the term should not be interpreted as excluding embodiments of the disclosure under circumstances.

The electronic device according to one or more embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that one or more embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," or "connected with" another element (e.g., a second element), it means that the element may be coupled with the other element directly (e.g., wiredly), wirelessly, or via a third element.

As used in connection with one or more embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

One or more embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between a case in which data is semi-permanently stored in the storage medium and a case in which the data is temporarily stored in the storage medium.

According to an embodiment, a method according to one or more embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one or more embodiments, each component (e.g., a module or a program) of the above-described components may include a single entity or multiple entities, and some of the multiple entities may be separately disposed in different components. According to one or more embodiments, one or more of the above-described components may be omitted, or one or more other components may be added. Alternatively or additionally, a plurality of components (e.g., modules or programs) may be integrated into a single component. In such a case, according to one or more embodiments, the integrated component may still perform one or more functions of each of the plurality of components in the same or similar manner as they are performed by a corresponding one of the plurality of components before the integration. According to one or more embodiments, operations performed by the module, the program, or another component may be carried out sequentially, in parallel, repeatedly, or heuristically, or one or more of the operations may be executed in a different order or omitted, or one or more other operations may be added.

No claim element is to be construed under the provisions of 35 U.S.C. § 112, sixth paragraph, unless the element is expressly recited using the phrase "means for" or "means."

FIG. 1 is a block diagram illustrating an electronic device 101 in a network environment 100 according to one or more embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to one or more embodiments, the antenna module 197 may form an mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra-low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
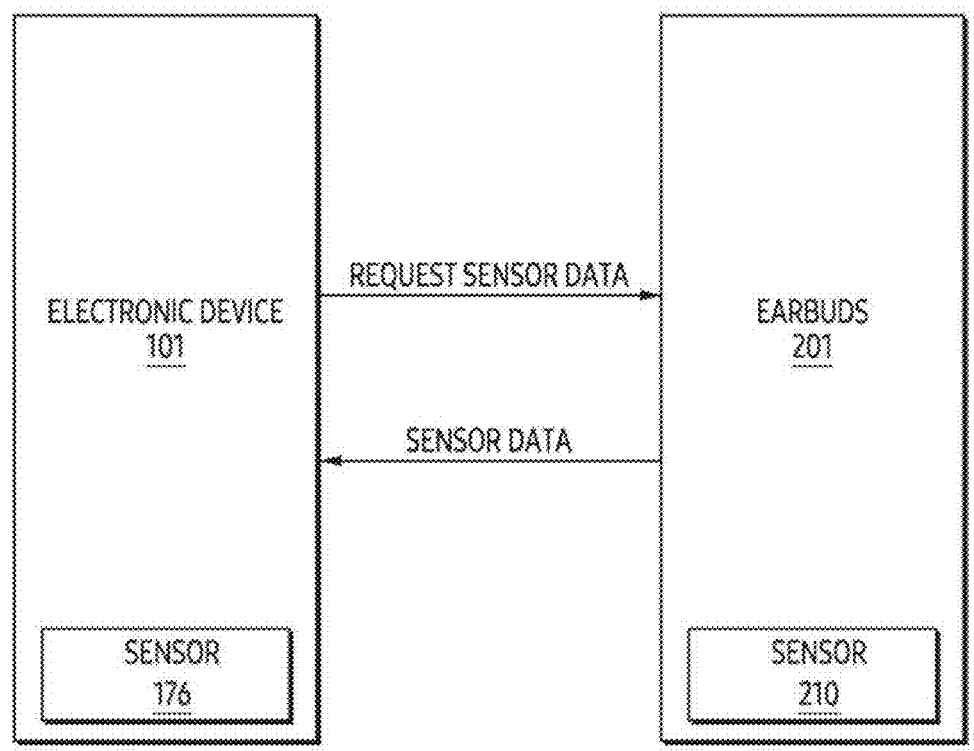
FIG. 2 illustrates an example of an electronic device and earbuds according to one or more embodiments.

FIG. 2 illustrates an example of an electronic device 101 and earbuds 201 according to one or more embodiments. Throughout the disclosure, the earbuds 201 and at least one earbud 201 are used interchangeably. That is, although the earbuds 201 are described in the disclosure, the earbuds 201 can be replaced with one earbud or at least one earbud.

Referring to FIG. 2, the electronic device 101 may identify a displacement of an electronic device through a sensor 176. For example, the sensor 176 of FIG. 2 may correspond to the sensor 176 illustrated in FIG. 1.

According to an embodiment, the sensor 176 may include at least one sensor. For example, the sensor 176 may include at least a gyro sensor, a magnetic sensor, and an acceleration sensor.

The acceleration sensor may measure acceleration in x-axis, y-axis, and z-axis directions, which occur when the electronic device 101 moves in three dimensions. The gyro sensor may measure an angular velocity, which occurs when the electronic device 101 rotates. A geomagnetic sensor may measure a strength and direction of a magnetic field. For example, the geomagnetic sensor may identify the strength and direction of the magnetic field applied to the electronic device 101 through a vector sum of the magnetic fields sensed in the x-axis, y-axis, and z-axis directions.

According to an embodiment, the electronic device 101 may determine a posture of the electronic device 101 based on sensing data obtained through the acceleration sensor, the gyro sensor, and the geomagnetic sensor of the sensor 176. For example, the electronic device 101 may obtain the posture of the electronic device 101 based on the sensing data obtained through the acceleration sensor and the gyro sensor, and may correct a posture error further based on the sensing data obtained through the geomagnetic sensor.

The earbuds 201 may be a device that outputs an audio signal played by the electronic device 101. For example, the earbuds 201 may include a first external device and a second external device. The first external device may be a speaker device (e.g., a left earbud) that outputs (or plays) a channel (e.g., a left channel) of an audio signal received from the electronic device 101. The second external device may be a speaker device (e.g., a right earbud) that outputs (or plays) another channel (e.g., a right channel) of the audio signal received from the electronic device 101.

According to an embodiment, the earbuds 201 may receive a signal to request sensor data from the electronic device 101. The earbuds 201 may establish a wireless connection with the electronic device 101. For example, the wireless connection may correspond to Bluetooth or Bluetooth low energy (BLE).

According to an embodiment, the earbuds 201 may include a sensor 210. The sensor 210 included in the earbuds 201 may be the same module as the sensor 176 included in the electronic device 101. For example, each of the first external device and the second external device included in the earbuds 201 may include the sensor 210. The first external device may obtain sensor data for identifying the posture of the first external device through the sensor 210. The second external device may obtain sensor data for identifying the posture of the second external device through the sensor 210. According to one or more embodiments, the sensor 210 included in the earbuds 201 may further include a contact detection sensor. For example, the first external device may identify that a user is worn on a left ear through the contact detection sensor. The second external device may identify that the user wears the second external device on a right ear through the contact detection sensor.

According to an embodiment, the earbuds 201 may transmit sensor data to the electronic device 101. The earbuds 201 may transmit the obtained sensor data to the electronic device 101 in response to the signal to request the sensor data. For example, the earbuds 201 may transmit a BLE packet including the sensor data to the electronic device 101. According to an embodiment, the earbuds 201 may transmit sensor data indicating whether the earbuds 201 are worn identified through the contact detection sensor to the electronic device 101. The sensor data indicating whether the earbuds 201 are worn may correspond to sensor data obtained by the contact detection sensor.

According to an embodiment, the electronic device 101 may identify the posture of the earbuds 201 based on sensor data received from the earbuds 201. For example, in case that the user wears only the first external device on the left ear, only sensor data of the first external device may be received. The electronic device 101 may identify a posture of the earbuds 201 corresponding to the first external device based on the sensor data of the first external device. The electronic device 101 may estimate a direction in which the user's gaze faces based on the posture of the earbuds 201 corresponding to the first external device. For another example, in case that the user wears only second external device on the right ear, only sensor data of the second external device may be received. The electronic device 101 may identify a posture of the earbuds 201 corresponding to the second external device based on the sensor data of the second external device. The electronic device 101 may identify the direction in which the user's gaze faces based on the posture of the earbuds 201 corresponding to the second external device. For another example, in case that the user wears both the first external device and the second external device on both ears, the sensor data may be received from the first external device and the second external device, respectively. The electronic device 101 may identify the direction in which the user's gaze faces, by averaging the sensor data of the first external device and the sensor data of the second external device.

Figure 3:
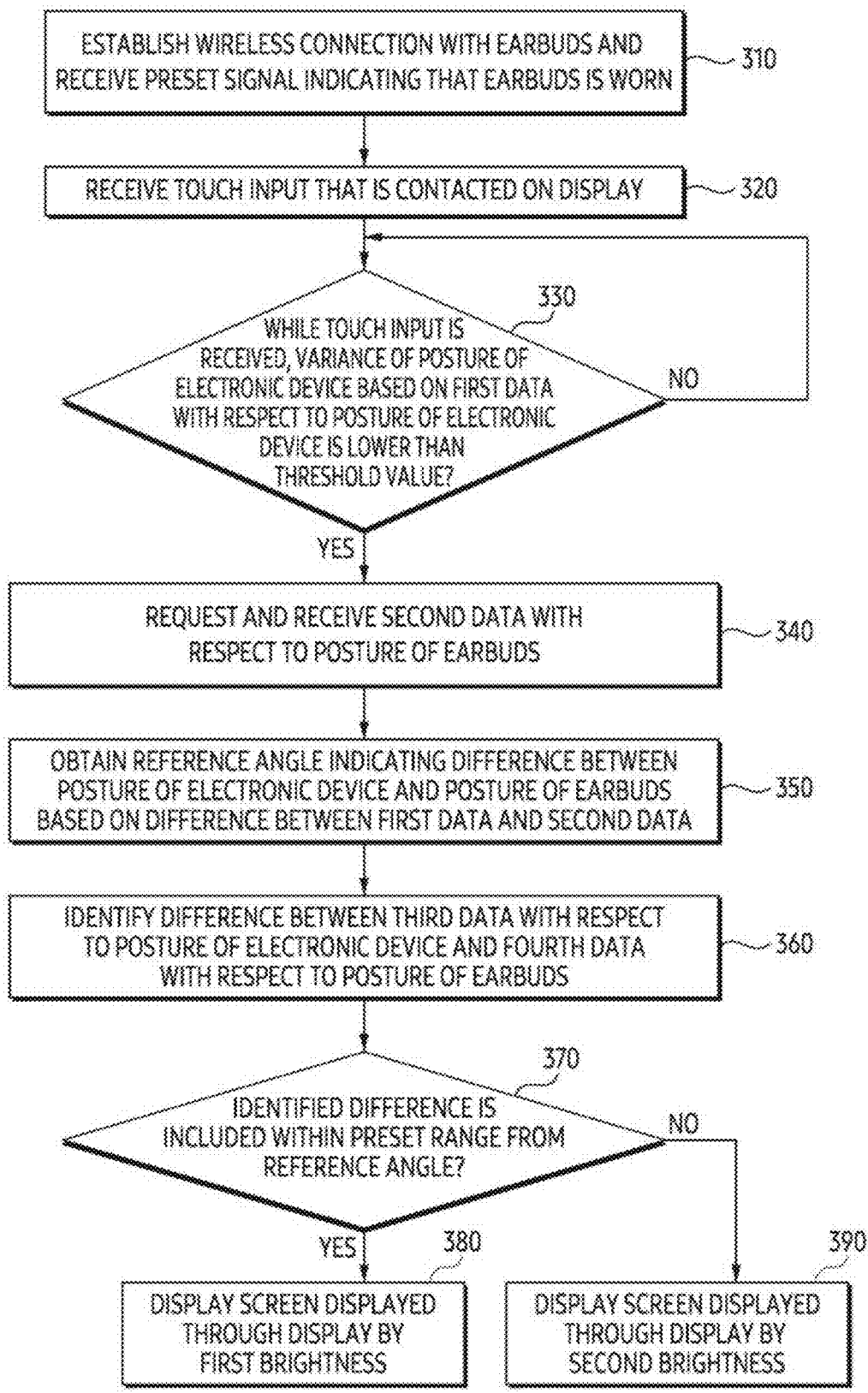
FIG. 3 is a flowchart illustrating an operation method of an electronic device according to one or more embodiments.

FIG. 3 is a flowchart illustrating an operation method of an electronic device 101 according to one or more embodiments.

Referring to FIG. 3, in operation 310, the electronic device 101 may establish a wireless connection with earbuds 201 and may receive a preset signal indicating that the earbuds 201 is worn. According to an embodiment, the electronic device 101 may establish the wireless connection with the earbuds 201 through Bluetooth or BLE communication. The earbuds 201 may identify whether the earbuds 201 are in a state that it is worn by a user through a contact detection sensor included in the sensor 210. For example, the earbuds 201 may transmit the preset signal indicating that at least one of the first external device and the second external device is worn to the electronic device 101.

In operation 320, the electronic device 101 may receive a touch input that is contacted on a display. The display may correspond to a display module 160 illustrated in FIG. 1. In case that the touch input is received through the display of the electronic device 101 after receiving the preset signal indicating that the earbuds 201 is worn by the user, it may be assumed that the user of the earbuds 201 is currently looking in a direction facing the display of the electronic device 101.

In operation 330, while the touch input is received, the electronic device 101 may identify whether variance of a posture of the electronic device 101 based on first data with respect to the posture of the electronic device 101 is lower than a threshold value. For example, in the operation 320, the electronic device 101 may activate a sensor 176 in response to receiving the touch input contacted on the display of the electronic device 101. The electronic device 101 may obtain the first data through the sensor 176. The first data may correspond to data capable of identifying the posture of the electronic device 101. For example, the first data may correspond to sensor data obtained through an acceleration sensor, a gyro sensor, and a geomagnetic sensor of the sensor 176.

In an embodiment, the electronic device 101 may identify whether the variance of the posture of the electronic device 101 is lower than the threshold value based on the first data obtained while the touch input is received. The electronic device 101 may compare whether magnitude of rotation of the electronic device 101 identified through the gyro sensor among the first data exceeds the threshold value. For example, in case that the variance of the posture exceeds the threshold value, the electronic device 101 may not be suitable for setting a reference angle of the earbuds 201 and the electronic device 101 because variance of a movement of the electronic device 101 is large. The reference angle may refer to an angle formed by a posture of the earbuds 201 and the electronic device 101 at a time instance when the user of the electronic device 101 looks at the display. The electronic device 101 may repeatedly perform the operation 330 until the variance of the posture is detected to be lower than the threshold value.

In an embodiment, the electronic device 101 may request second data to the earbuds 201 even if the variance of the detected posture exceeds the threshold value. For example, the variance of the posture may be based on a movement for changing a page orientation. The page orientation may be any one of a portrait mode for displaying an object on a display of a vertical direction or a landscape mode for displaying an object on a display of a horizontal direction. In case that the variance of the detected posture exceeds the threshold value, in case of a posture change of the electronic device 101 for changing the page orientation, the electronic device 101 of the electronic device 101 may request the second data to the earbuds 201.

In operation 340, the electronic device 101 may request the second data with respect to the posture of the earbuds 201 and may receive the second data. While the touch input is received in the operation 330, the electronic device 101 may detect that the variance of the posture of the electronic device 101 is lower than the threshold value. In response to detecting that the variance of the posture is lower than the threshold value, the electronic device 101 may be suitable for setting the reference angle of the earbuds 201 and the electronic device 101 because the variance of the movement of the electronic device 101 is small. Thus, the electronic device 101 may transmit a signal to request the second data to the earbuds 201 in order to set the reference angle. The second data may refer to data with respect to the posture of the earbuds 201. For example, the second data may be sensor data obtained through the sensor 210 of the earbuds 201.

In operation 350, the electronic device 101 may obtain a reference angle indicating a difference between the posture of the electronic device 101 and the posture of the earbuds 201 based on a difference between the first data and the second data. For example, the electronic device 101 may identify a direction in which the earbuds 201 face, by receiving the second data from the earbuds 201. For example, the direction in which the earbuds 201 face may correspond to the same direction as the user's gaze. The electronic device 101 may identify a direction in which the electronic device 101 faces based on the first data. For example, the electronic device 101 may identify a normal direction with respect to a plane including the display of the electronic device 101 based on the sensor data obtained through the sensor 176. The electronic device 101 may calculate a difference between the direction in which the electronic device 101 faces and the direction in which the earbuds 201 faces, and may identify the difference as the reference angle.

In operation 360, the electronic device 101 may identify a difference between third data with respect to the posture of the electronic device 101 and fourth data with respect to the posture of the earbuds 201. The electronic device 101 may obtain the third data in response to stopping reception of the touch input. For example, from a time instance when the touch input is not received through the display of the electronic device 101, the electronic device 101 may monitor a change in the posture of the electronic device 101 through the sensor 176. In response to stopping reception of the touch input, the electronic device 101 may receive the fourth data by requesting the fourth data to the earbuds 201 at each predefined period. In other words, the fourth data may be sensor data used to monitor a change in the posture of the earbuds 201 from a time instance when the user does not touch the display of the electronic device 101. Based on the third data and the fourth data, the electronic device 101 may identify how a direction in which the electronic device 101 looks and a direction in which the earbuds 201 look are changed.

In operation 370, the electronic device 101 may determine whether the identified difference is included within a preset range from the reference angle. For example, the identified difference may be an angle formed by the direction in which the earbuds 201 face and the direction in which the electronic device 101 faces, after the reception of the touch input is stopped.

In operation 380, the electronic device 101 may display a screen displayed through the display with a first brightness. For example, in case that an angle difference formed by the direction in which the earbuds 201 face and the direction in which the electronic device 101 faces is included within the preset range from the reference angle, it may be assumed that the user is currently looking at the display of the electronic device 101. Since the user is in a state of looking at the display, the electronic device 101 may display the display of the electronic device 101 with the first brightness. For example, the first brightness may be a brightness when the electronic device 101 displays the screen through the display to be brightest.

In operation 390, the electronic device 101 may display the screen displayed through the display with a second brightness. For example, in case that the angle difference formed by the direction in which the earbuds 201 face and the direction in which the electronic device 101 faces is not included within the preset range from the reference angle, it may be assumed that the user does not currently look at the display of the electronic device 101. Since the user is in a state of not looking at the display, the electronic device 101 may change the brightness of the display to the second brightness. The second brightness may be a brightness that is lower than the first brightness. For example, the second brightness may be a brightness when the electronic device 101 displays screen through the display to be darkest.

Figure 4A:
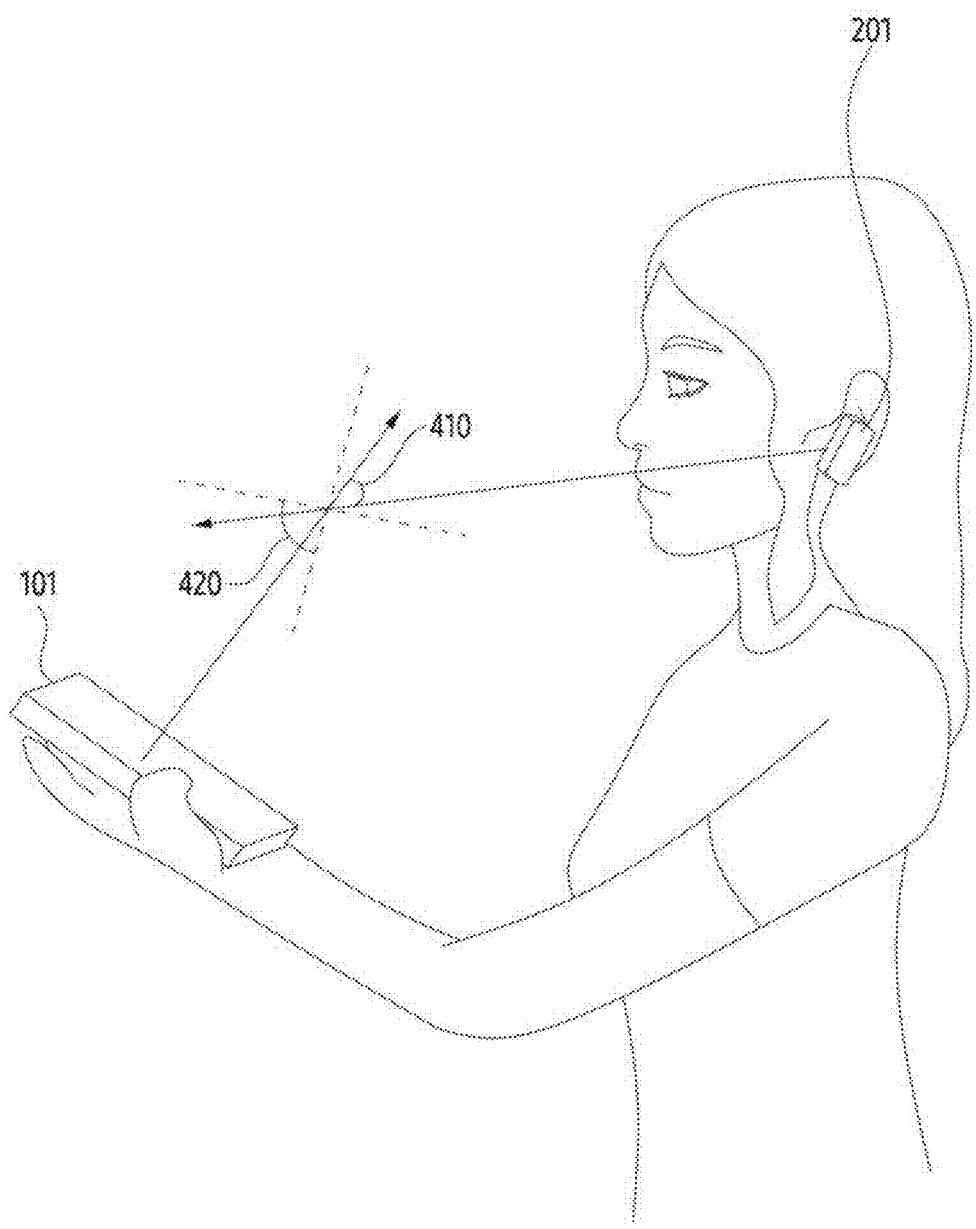
FIG. 4A illustrates an example of displaying a display of an electronic device with a first brightness, according to one or more embodiments.
Figure 4B:
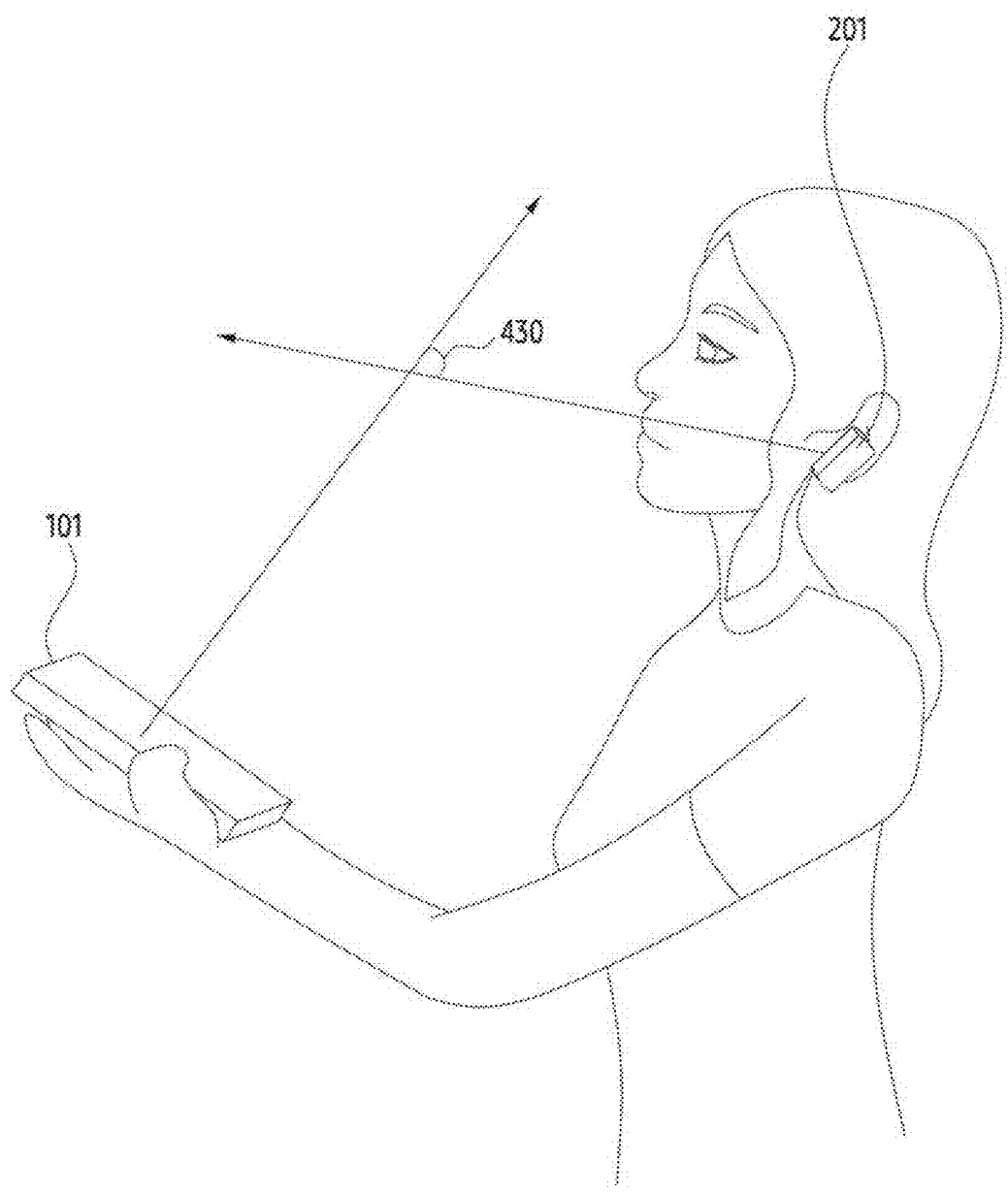
FIG. 4B illustrates an example of displaying a display of an electronic device with a second brightness, according to one or more embodiments.

FIGS. 4A and 4B illustrate an example of displaying a display of an electronic device 101 with a first brightness or a second brightness according to one or more embodiments.

Referring to FIG. 4A, the electronic device 101 may identify a reference direction based on first data obtained through a sensor 176. The reference direction may be the same as a direction of a normal vector with respect to a plane including the display of the electronic device 101. The electronic device 101 may identify a current posture of the electronic device 101 by using sensor data obtained from each of an acceleration sensor, a gyro sensor, and a geomagnetic sensor. In other words, identifying the posture of the electronic device 101 may be the same as identifying the normal vector with respect to the plane including the display.

In the above-described embodiment, the reference direction of the electronic device 101 is described as the direction of the normal vector of the plane including the display, but is not limited thereto. According to one or more embodiments, the reference direction of the electronic device 101 may be set to direction facing any one of the top, bottom, left, and right, when the display is viewed in front of the display.

According to an embodiment, the electronic device 101 may identify a reference direction of the earbuds 201 based on second data obtained through a sensor 210 of the earbuds 201. The reference direction may be the same as a direction facing front of the earbuds 201.

According to an embodiment, the electronic device 101 may identify a reference angle 410. The electronic device 101 may calculate an angle formed by the reference direction of the electronic device 101 and the reference direction of the earbuds 201. The calculated angle may correspond to the reference angle 410. In case that the angle formed by the electronic device 101 and the earbuds 201 is the same as the reference angle 410, the electronic device 101 may identify that a user wearing the earbuds 201 is looking at the display of the electronic device 101.

According to one or more embodiments, the electronic device 101 may set an angle 420 of a preset range from the reference angle 410. The angle 420 of the preset range may be a sum of the reference angle 410 and a margin that may be estimated to look at the electronic device 101 considering the gaze of the user wearing the earbuds 201.

Referring to FIG. 4A, a measurement angle formed between the electronic device 101 and the earbuds 201 may be included in the angle 420 of the preset range from the reference angle 410. Thus, the electronic device 101 may identify the user of the electronic device 101 staring at the display, and may display a screen displayed through the display of the electronic device 101 with the first brightness.

Referring to FIG. 4B, the size of the angle of the reference direction of the electronic device 101 and the reference direction of the earbuds 201 may be changed. For example, while a movement of the electronic device 101 does not occur, the user wearing the earbuds 201 may change his or her gaze upward.

According to an embodiment, the electronic device 101 may identify a variance of a posture of the earbuds 201 based on fourth data received from the earbuds 201. For example, the electronic device 101 may identify a size of a measurement angle 430 by calculating a dot product between a normal vector with respect to the plane including the display of the electronic device 101 and a vector identical to the direction in which the earbuds 201 faces the front. The electronic device 101 may identify whether the user is currently looking at the display of the electronic device 101 by comparing the size of the measurement angle 430 with the angle 420 of the preset range from the reference angle 410 illustrated in FIG. 4A. Referring to FIG. 4B, since the size of the measurement angle 430 is greater than the angle 420 of the preset range, the electronic device 101 may identify that the gaze of the user wearing the earbuds 201 may not currently look at the display of the electronic device 101. The electronic device 101 may lower the brightness of the screen displayed through the display of the electronic device 101 to the second brightness, based on the comparison result between the measurement angle 430 and the angle 420 of the preset range.

Figure 5:
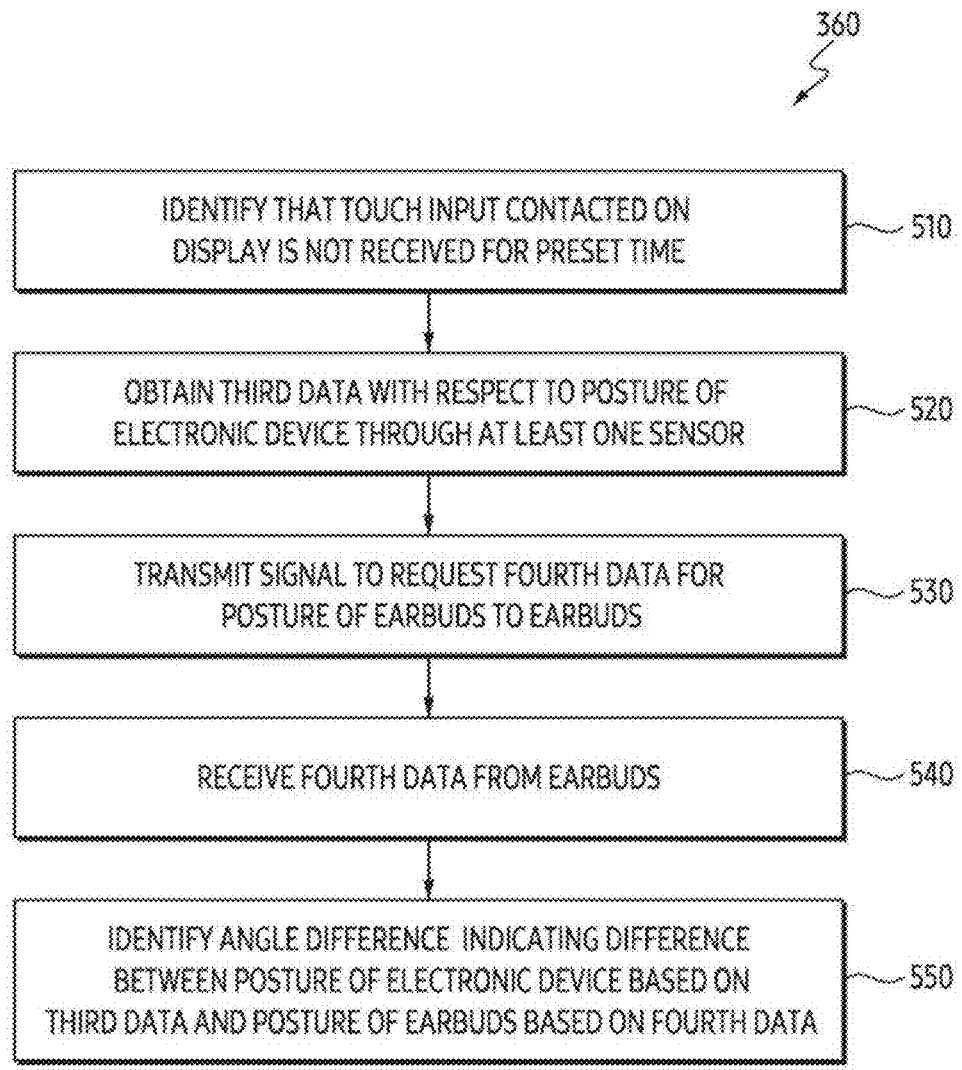
FIG. 5 is a flowchart illustrating an operation method in which an electronic device identifies a measurement angle, according to one or more embodiments.

FIG. 5 is a flowchart illustrating an operation method in which an electronic device 101 identifies a measurement angle, according to one or more embodiments.

Referring to FIG. 5, in operation 510, the electronic device 101 may identify that a touch input contacted on a display is not received for a preset time. Since the electronic device 101 may not predict at which time instance the touch input is stopped, the electronic device 101 may count the preset time whenever each touch input is received. For example, the preset time may be 2 seconds, but the 2 seconds is only an example and may have various values. For example, the electronic device 101 may identify that the touch input has been stopped, in case that no other touch input is received within 2 seconds from the time instance when the touch input was last received.

In operation 520, the electronic device 101 may obtain third data with respect to a posture of the electronic device 101 through at least one sensor. For example, the electronic device 101 may obtain the third data through a sensor 176, in response to identifying the stop of the touch input in the operation 510. The third data may be sensor data for monitoring a change of the posture of the electronic device 101 after the touch input is stopped.

In operation 530, the electronic device 101 may transmit a signal to request fourth data for a posture of earbuds 201 to the earbuds 201, and in operation 540, the electronic device 101 may receive the fourth data from the earbuds 201. The fourth data may be sensor data for monitoring a change of the posture of the earbuds 201 after the touch input is stopped. According to one or more embodiments, the electronic device 101 may transmit the signal to request the fourth data to the earbuds 201 every preset period.

In the above-described embodiment, the operation 520 is described as preceding the operation 530, but is not limited thereto. For example, in response to identifying the stop of the touch input in the operation 510, the electronic device 101 may first transmit the signal to request the fourth data to the earbuds 201. In addition, the electronic device 101 may obtain the third data through the sensor 176 and simultaneously may request the fourth data to the earbuds 201.

In operation 550, the electronic device 101 may identify a measurement angle indicating a difference between the posture of the electronic device 101 based on the third data and the posture of the earbuds 201 based on the fourth data. The measurement angle may refer to an angle formed by the direction in which the earbuds 201 face and the direction in which the electronic device 101 faces.

Figure 6:
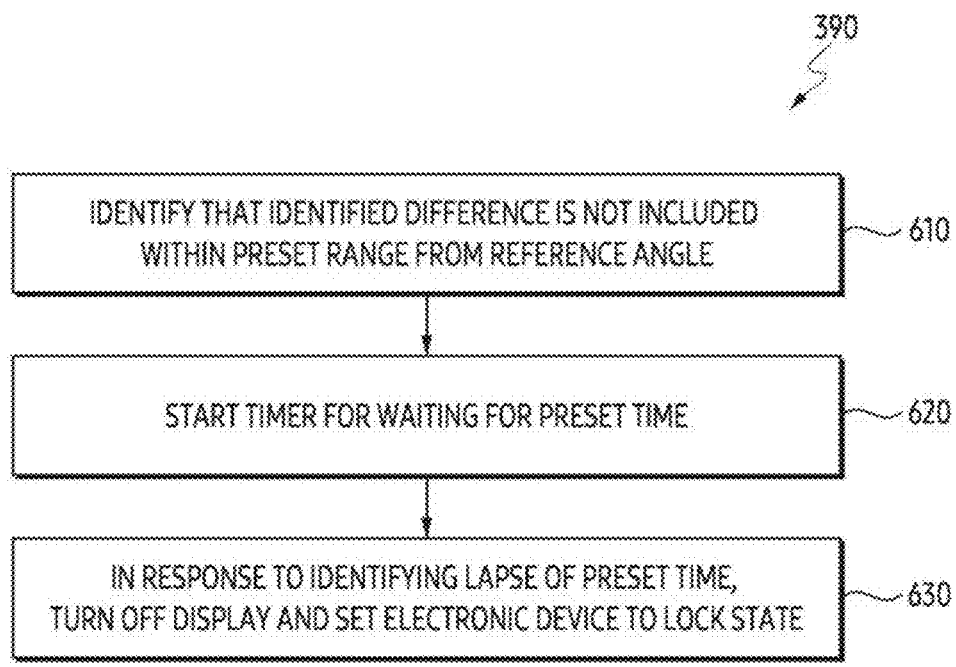
FIG. 6 is a flowchart illustrating an operation method of changing an electronic device to a lock state according to one or more embodiments.

FIG. 6 is a flowchart illustrating an operation method of changing an electronic device 101 to a lock state according to one or more embodiments.

Referring to FIG. 6, in operation 610, the electronic device 101 may identify that an identified difference is not included within a preset range from a reference angle. For example, the reference angle obtained in operation 350 of FIG. 3 may be 20°, and the preset range may be 10°. In case that the identified difference is 50°, the electronic device 101 may identify that the identified difference is outside of the preset range from the reference angle. In response to identifying that the identified difference is not included in the preset range from the reference angle, the electronic device 101 may change a brightness of a display of the electronic device 101 to a second brightness.

In operation 620, the electronic device 101 may start a timer for waiting for a preset time. In the operation 610, the electronic device 101 may start the timer from a time instance when it identified that the identified difference is not included in the preset range from the reference angle. The preset time is a time length set by the user and may be a length that is a reference determining that the user no longer manipulates the electronic device 101. For example, the user may set the preset time to 30 seconds.

In operation 630, in response to identifying lapse of the preset time, the electronic device 101 may turn off the display and may set the electronic device 101 to the lock state. The lock state may be a state before authenticating that the user of the electronic device 101 is himself/herself. For example, in case that the electronic device 101 identifies that the user does not look at the current display based on the difference identified in the operation 610, and the user does not look at the display until the preset time elapses, it may be determined that a possibility of manipulating the electronic device 101 in the future is low, and there is no need to display at least one object through the display. Thus, the electronic device 101 may change the electronic device 101 to the lock state in response to the lapse of the preset time.

Figure 7:
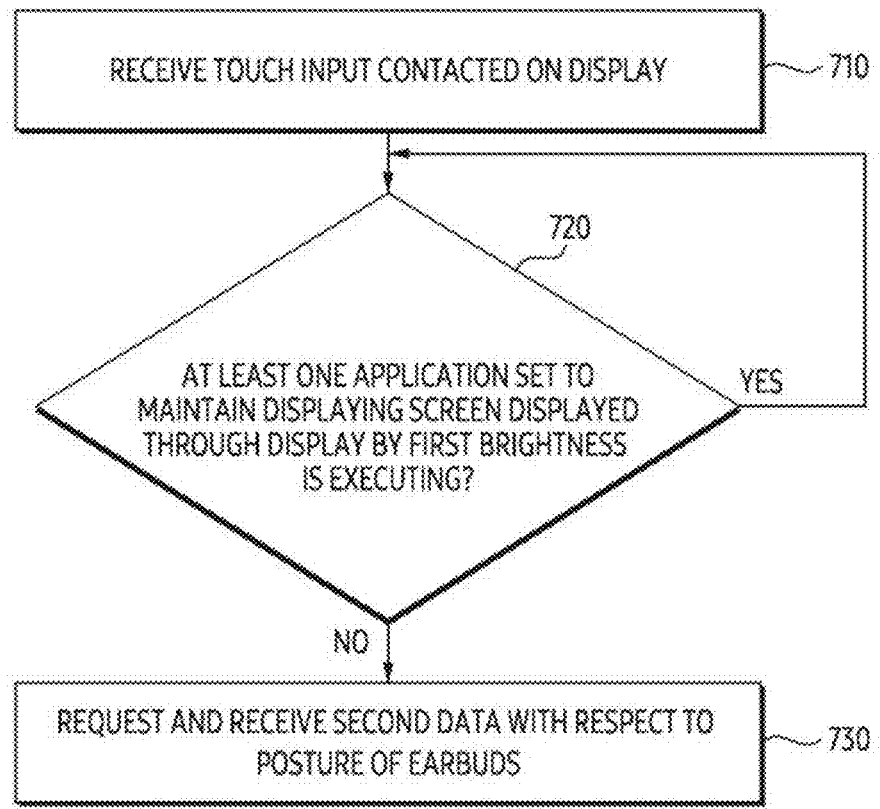
FIG. 7 is a flowchart illustrating an operation method of determining whether an electronic device requests second data, according to one or more embodiments.

FIG. 7 is a flowchart illustrating an operation method of determining whether an electronic device 101 requests second data, according to one or more embodiments.

Referring to FIG. 7, in operation 710, the electronic device 101 may receive a touch input contacted on a display. The operation 710 may correspond to operation 320 of FIG. 3.

In operation 720, the electronic device 101 may identify whether at least one application set to display a screen displayed through the display with a first brightness is executing. The at least one application may refer to an application that maintains display with the first brightness without dimming the screen displayed through the display even when a user's touch input is not received. For example, the at least one application may include at least an application for playing a video and an application for playing a game. In case that the at least one application is being executed, the touch input received in the operation 710 may not be a touch input contacted in a state that the user is looking at the display of the electronic device 101. Thus, in case that the at least one application is executing, the electronic device 101 may bypass requesting the second data with respect to a posture of earbuds 201 to the earbuds 201.

In operation 730, the electronic device 101 may request and receive the second data with respect to the posture of the earbuds 201. The operation 730 may correspond to operation 340 of FIG. 3.

Figure 8:
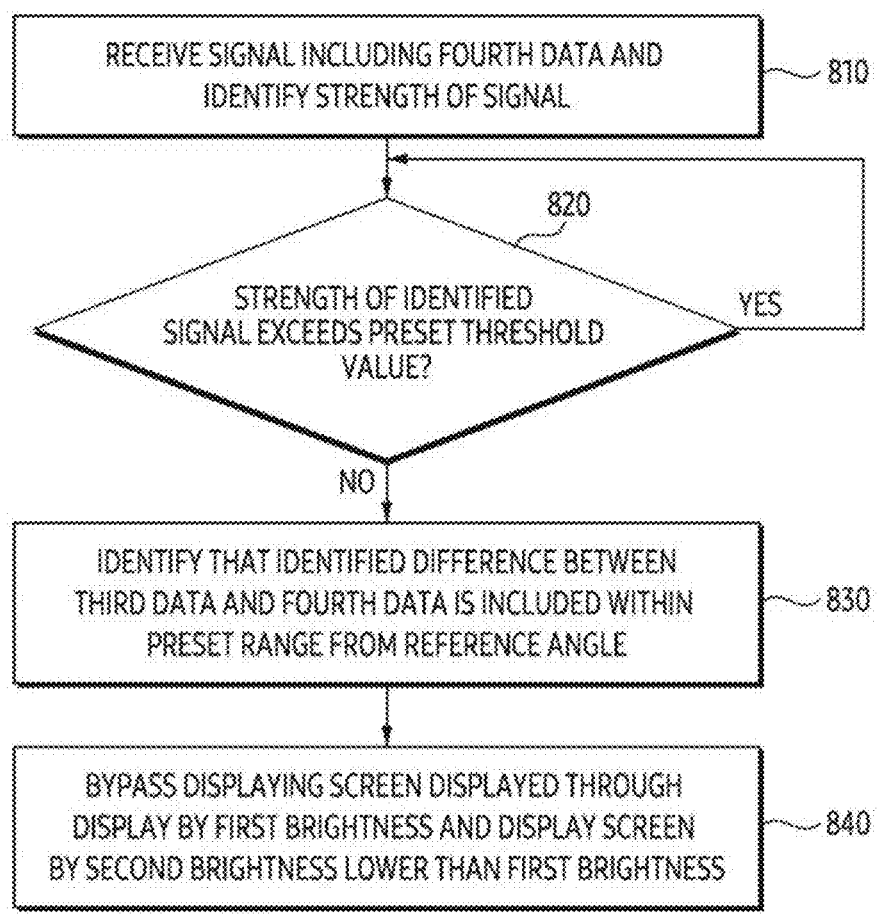
FIG. 8 is a flowchart illustrating an operation method of an electronic device according to one or more embodiments.

FIG. 8 is a flowchart illustrating an operation method of an electronic device according to one or more embodiments.

Referring to FIG. 8, in operation 810, an electronic device 101 may receive a signal including fourth data and may identify a strength of the signal. For example, in case that a user moves away from the electronic device 101 in a state of wearing earbuds 201, the strength of the signal may decrease. The electronic device 101 may identify how far the electronic device 101 and the earbuds 201 are separated according to the reception strength of the signal including the fourth data.

In operation 820, the electronic device 101 may identify whether the strength of the identified signal exceeds a preset threshold value. In case that the strength of the identified signal exceeds the preset threshold value, the electronic device 101 may identify that the earbuds 201 are located within a close distance from the electronic device 101. In case that the strength of the identified signal is less than the preset threshold value, the electronic device 101 may identify that the earbuds 201 have moved far from the electronic device 101.

In operation 830, the electronic device 101 may identify that a measurement angle based on a difference between third data and the fourth data is included within a preset range from the reference angle. Based on the difference between the third data and the fourth data, the electronic device 101 may identify that an angle between a direction in which the electronic device 101 is currently facing and a direction in which the earbuds 201 are currently facing is within the preset range from the reference angle. For example, the direction of the earbuds 201 may match a direction in which the user looks at a display of the electronic device 101.

In operation 840, the electronic device 101 may bypass displaying a screen displayed through the display with a first brightness and may display the screen with a second brightness lower than the first brightness. Since the strength of the signal received from the earbuds 201 in the operation 820 is smaller than the preset threshold value, the electronic device 101 may identify that the earbuds 201 are located far from the electronic device 101. Since the user wearing the earbuds 201 is located far from the display of the electronic device 101, the electronic device 101 may not display the screen with the first brightness but display the screen with the second brightness lower than the first brightness even if it is included in the angle at which the user looks at the display of the electronic device 101.

Figure 9:
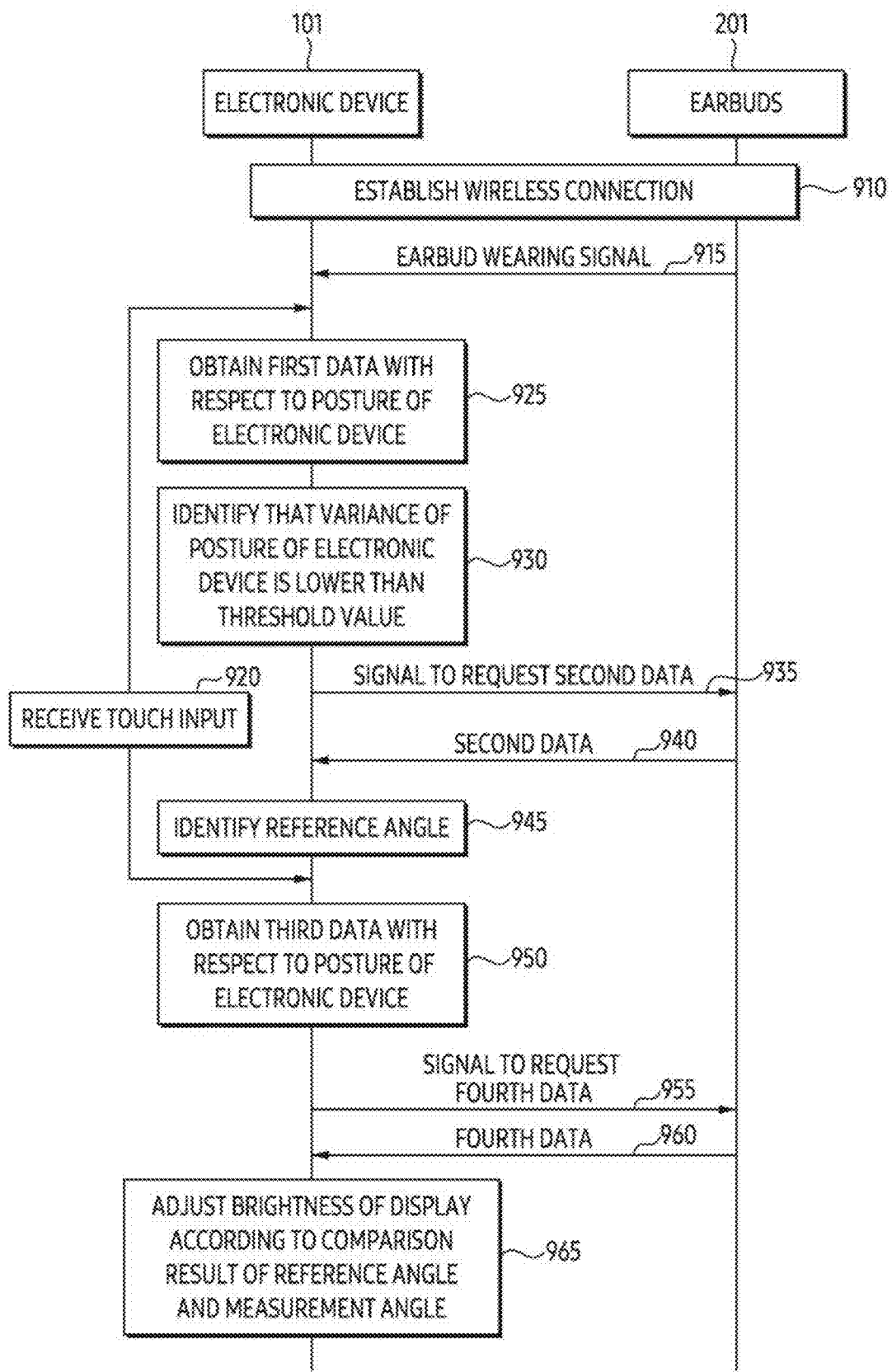
FIG. 9 is a signal exchange diagram between an electronic device and earbuds according to one or more embodiments.

FIG. 9 is a signal exchange diagram between an electronic device 101 and earbuds 201 according to one or more embodiments.

Referring to FIG. 9, in operation 910, the electronic device 101 may establish a wireless connection with the earbuds 201. The wireless connection may include Bluetooth communication and Bluetooth low power communication.

In operation 915, the earbuds 201 may transmit an earbud wearing signal to the electronic device 101. The earbud wearing signal may be sensor data obtained through a contact detection sensor included in a sensor 210. The earbud wearing signal may correspond to a preset signal indicating that the earbuds 201 described in operation 310 is worn.

In operation 920, the electronic device 101 may receive a touch input. The touch input may be an input received by contacting the display of the electronic device 101. According to an embodiment, the touch input may be received for a certain period of time.

In operation 925, the electronic device 101 may obtain first data on a posture of the electronic device 101. The first data may be sensor data for identifying a variance of the posture of the electronic device 101. After establishing the wireless connection with the earbuds 201 and receiving the earbud wearing signal, the electronic device 101 may activate a sensor 176 in response to receiving the touch input of the operation 920. The electronic device 101 may obtain the first data through the sensor 176.

In operation 930, the electronic device 101 may identify that the variance of the posture of the electronic device 101 is lower than a threshold value. In case that the variance of the posture of the electronic device 101 identified through the first data exceeds the threshold value, it may be determined that the electronic device 101 moves a lot. Thus, in case that a movement of the electronic device 101 is large, since the user wearing the earbuds 201 may not determine a reference angle for identifying the direction in which the user looks at the display of the electronic device 101, obtaining the first data may be repeated until it is identified that the variance of the posture of the electronic device 101 is lower than the threshold value.

In operation 935, the electronic device 101 may transmit a signal to request second data to the earbuds 201, and in operation 940, may receive the second data from the earbuds 201. The second data may be sensor data for identifying a posture of the earbuds 201. The second data may be obtained through the sensor 210 of the earbuds 201.

In operation 945, the electronic device 101 may identify the reference angle. The reference angle may refer to an angle formed by the posture of the earbuds 201 and the electronic device 101 when the user of the electronic device 101 looks at the display. The electronic device 101 may assume that the user is looking at the display of the electronic device 101 while the touch input is received through the display. Thus, when the touch input is received through the display and the variance of the posture of the electronic device 101 satisfies lower than the threshold value, The electronic device 101 may request the second data with respect to the posture of the earbuds 201 to the earbuds 201, and identify the reference angle based on the first data and the second data.

In operation 950, the electronic device 101 may obtain third data with respect to the posture of the electronic device 101. The electronic device 101 may obtain the third data in response to stopping reception of the touch input. The third data may be sensor data for monitoring the variance of the posture of the electronic device 101 after identifying the reference angle.

In operation 955, the electronic device 101 may transmit a signal to request fourth data to the earbuds 201, and in operation 960, the electronic device 101 may receive the fourth data from the earbuds 201. The fourth data may be sensor data for monitoring the variance of the posture of the earbuds 201 after identifying the reference angle.

In operation 965, the electronic device 101 may adjust a brightness of the display according to a comparison result of the reference angle and a measurement angle. According to an embodiment, in case that the measurement angle is not included within a preset range from the reference angle, the electronic device 101 may identify that the user wearing the earbuds 201 currently no longer looks at the display of the electronic device 101. Thus, the electronic device 101 may display a screen displayed through the display with a second brightness. For example, the second brightness may be the lowest brightness value among brightness values of the screen displayed by the electronic device 101.

According to an embodiment, in case that the measurement angle is included within the preset range from the reference angle, the electronic device 101 may identify that the user wearing the earbuds 201 is looking at the display of the electronic device 101. Thus, the electronic device 101 may display the screen displayed through the display with a first brightness. For example, the first brightness may be the highest brightness value among brightness values of the screen displayed by the electronic device 101.

According to one or more embodiments, until the touch input is received again through the display of the electronic device 101 and the reference angle is newly identified, the brightness of the display of the electronic device 101 may be changed in real time according to the measurement angle. For example, the user of the earbuds 201 may look at the display of the electronic device 101 and then change his or her gaze to a left 90° direction. As the gaze is moved to the left 90° direction, the measurement angle may not be included within the preset range from the reference angle. In response to the movement of the gaze to the left 90° direction, the brightness of the display of the electronic device 101 may be lowered to the second brightness. Thereafter, in case that the user moves the gaze to look at the display of the electronic device 101 again, the measurement angle may be included within the preset range from the reference angle. In response to the measurement angle being included within the preset range from the reference angle, the brightness of the display of the electronic device 101 may be changed from the second brightness to the first brightness.

The electronic device may automatically turn off the display to minimize current consumption in case that a user input (a touch, various key inputs) is not received until a preset time elapses, except a case that an application such as video playback is executed.

The user of the electronic device may have to look at the display for a relatively long time or check the screen periodically/non-periodically to check the display, without the user input. In case that the user holds the electronic device, the display of the electronic device may be turned on by simply applying the user input. However, in case that the user is not holding the electronic device or is unable to hold the electronic device (e.g., while eating, writing, or operating another device), it may cause inconvenience as another action must be stopped and the user input must be applied.

An electronic device according to an embodiment as described above may comprise at least one memory configured to store instructions, at least one processor, at least one sensor, a display, and a communication circuitry. The at least one processor may be further configured to execute the instructions to, while identifying whether earbuds is worn based on a preset signal received from the earbuds connected to the electronic device, receive a touch input contacted on the display. The at least one processor may be further configured to execute the instructions to, based on first data obtained through the at least one sensor while the touch input is received, identify that a variance of a posture of the electronic device is lower than a threshold value. The at least one processor may be further configured to execute the instructions to, in response to identifying that the variance of the posture of the electronic device is lower than the threshold value while the touch input is received, transmit a signal to request second data with respect to a posture of the earbuds to the earbuds through the communication circuitry. The at least one processor may be further configured to execute the instructions to receive the second data through the communication circuitry from the earbuds. The at least one processor may be further configured to execute the instructions to obtain a reference angle indicating a difference of the posture of the electronic device and the posture of the earbuds based on a difference of the first data with respect to the posture of the electronic device and the second data with respect to the posture of the earbuds while the touch input is received. The at least one processor may be further configured to execute the instructions to, after obtaining the reference angle, identify a difference between third data with respect to the posture of the electronic device obtained through the at least one sensor and fourth data with respect to the posture of the earbuds received from the earbuds through the communication circuitry. The at least one processor may be further configured to execute the instructions to, based on identifying that the difference between the third data and the fourth data is within a preset range from the reference angle, display a screen, that is displayed through the display, with a first brightness. The at least one processor may be further configured to execute the instructions to, based on identifying that the difference between the third data and the fourth data is outside of the preset range, display the screen with a second brightness lower than the first brightness. According to an embodiment, the electronic device recognizes that the user is looking at the display of the electronic device by identifying the difference between the posture of the electronic device and the posture of the earbuds, and provide user convenience when using the electronic device by turning on the turned-off screen without a separate input operation, based on sensing data received from the earbuds.

According to an embodiment, the at least one sensor may at least include an acceleration sensor, a gyro sensor and a geomagnetic sensor.

According to an embodiment, the at least one processor may be further configured to execute the instructions to identify a strength of a signal including the fourth data, and identify that the strength of the identified signal is lower than a preset threshold value. The at least one processor may be further configured to execute the instructions to, in case that the strength of the identified signal is lower than the preset threshold value, in response to identifying that the difference between the third data and the fourth data is within the preset range from the reference angle, bypass displaying the screen, which is displayed through the display, with the first brightness, and display the screen with the second brightness.

According to an embodiment, the at least one processor may be further configured to execute the instructions to identify that a preset time is elapsed from a time instance identifying that the strength of the identified signal is lower than the preset threshold value. The at least one processor may be further configured to execute the instructions to, in response to identifying that a preset time is elapsed, turn-off the display and set the electronic device as a lock state.

According to an embodiment, the at least one processor may be further configured to execute the instructions to identify that a preset time is elapsed from a time instance displaying the screen with the second brightness lower than the first brightness. The at least one processor may be further configured to execute the instructions to, in response to identifying that a preset time is elapsed, turn-off the display and set the electronic device as a lock state.

According to an embodiment, the at least one processor may be further configured to execute the instructions to, after obtaining the reference angle, identify that the touch input contacted on the display is received. The at least one processor may be further configured to execute the instructions to, in response to identifying that the touch input is received, calibrate the reference angle based on the first data obtained through the at least one sensor while the touch input is received and the second data with respect to the posture of the earbuds.

According to an embodiment, the at least one processor may be further configured to execute the instructions to identify that at least one application, that is being set to display the screen, which is displayed through the display, with the first brightness, is executed, and in response to identifying that the at least one application is executed, bypass calibration of the reference angle.

According to an embodiment, the at least one processor may be further configured to execute the instructions to, in case that a variance of the posture of the electronic device exceeds the threshold value, based on the first data, identify that a page orientation of the electronic device is changed.

According to an embodiment, the page orientation may be corresponding to one of a landscape mode corresponding to a horizontal mode and a portrait mode corresponding to a vertical mode.

According to an embodiment, the at least one processor may be further configured to execute the instructions to, in response to identifying that the page orientation is changed, transmit a signal to request second data with respect to the posture of the earbuds to the earbuds through the communication circuitry.

An operation method of an electronic device comprising at least one memory configured to store instructions, at least one processor, at least one sensor, a display and a communication circuitry according to an embodiment as described above, may comprise, while identifying whether earbuds is worn based on a preset signal received from the earbuds connected to the electronic device, receiving a touch input contacted on the display. The operation method may comprise, based on first data obtained through the at least one sensor while the touch input is received, identifying that a variance of a posture of the electronic device is lower than a threshold value. The operation method may comprise, in response to identifying that the variance of the posture of the electronic device is lower than the threshold value while the touch input is received, transmitting a signal to request second data with respect to a posture of the earbuds to the earbuds through the communication circuitry. The operation method may comprise receiving the second data through the communication circuitry from the earbuds. The operation method may comprise obtaining a reference angle indicating a difference of the posture of the electronic device and the posture of the earbuds based on a difference of the first data with respect to the posture of the electronic device and the second data with respect to the posture of the earbuds while the touch input is received. The operation method may comprise, after obtaining the reference angle, identifying a difference between third data with respect to the posture of the electronic device obtained through the at least one sensor and fourth data with respect to the posture of the earbuds received from the earbuds through the communication circuitry. The operation method may comprise, based on identifying that the difference between the third data and the fourth data is within a preset range from the reference angle, displaying a screen, that is displayed through the display, with a first brightness. The operation method may comprise, based on identifying that the difference between the third data and the fourth data is outside of the preset range, displaying the screen with a second brightness lower than the first brightness.

According to an embodiment, the at least one sensor may at least include an acceleration sensor, a gyro sensor and a geomagnetic sensor.

According to an embodiment, the operation method of the electronic device may comprise identifying a strength of a signal including the fourth data, and identifying that the strength of the identified signal is lower than a preset threshold value. The operation method may further comprise, in case that the strength of the identified signal is lower than the preset threshold value, in response to identifying that the difference between the third data and the fourth data is within the preset range from the reference angle, bypassing displaying the screen, which is displayed through the display, with the first brightness, and displaying the screen with the second brightness.

According to an embodiment, the operation method of the electronic device may comprise identifying that a preset time is elapsed from a time instance identifying that the strength of the identified signal is lower than the preset threshold value. The operation method may further comprise, in response to identifying that a preset time is elapsed, turning-off the display and setting the electronic device as a lock state.

According to an embodiment, the operation method of the electronic device may comprise identifying that a preset time is elapsed from a time instance displaying the screen with the second brightness lower than the first brightness. The operation method may further comprise, in response to identifying that a preset time is elapsed, turning-off the display and setting the electronic device as a lock state.

According to an embodiment, the operation method of the electronic device may comprise, after obtaining the reference angle, identifying that the touch input contacted on the display is received. The operation method may further comprise, in response to identifying that the touch input is received, calibrating the reference angle based on the first data obtained through the at least one sensor while the touch input is received and the second data with respect to the posture of the earbuds.

According to an embodiment, the operation method of the electronic device may comprise identifying that at least one application, that is being set to display the screen and is displayed through the display with the first brightness, is executed. The operation method may further comprise, in response to identifying that the at least one application is executed, bypassing calibration of the reference angle.

According to an embodiment, the operation method of the electronic device may further comprise, in case that a variance of the posture of the electronic device exceeds the threshold value, based on the first data, identifying that a page orientation of the electronic device is changed.

According to an embodiment, the page orientation may be corresponding to one of a landscape mode corresponding to a horizontal mode and a portrait mode corresponding to a vertical mode.

According to an embodiment, the operation method of the electronic device may further comprise, in response to identifying that the page orientation is changed, transmitting a signal to request second data with respect to the posture of the earbuds to the earbuds through the communication circuitry.

According to an embodiment, a non-transitory computer readable storage medium, when executed by at least one processor of an electronic device with at least one memory, at least one processor, at least one sensor, display, and communication circuitry configured to store instructions, may be configured to, while identifying whether earbuds is worn based on a preset signal received from the earbuds connected to the electronic device, receive a touch input contacted on the display, based on first data obtained through the at least one sensor while the touch input is received, identify that a variance of a posture of the electronic device is lower than a threshold value, in response to identifying that the variance of the posture of the electronic device is lower than the threshold value while the touch input is received, transmit a signal to request second data with respect to a posture of the earbuds to the earbuds through the communication circuitry, receive the second data through the communication circuitry from the earbuds, obtain a reference angle indicating a difference of the posture of the electronic device and the posture of the earbuds based on a difference of the first data with respect to the posture of the electronic device and the second data with respect to the posture of the earbuds while the touch input is received, after obtaining the reference angle, identify a difference between third data with respect to the posture of the electronic device obtained through the at least one sensor and fourth data with respect to the posture of the earbuds received from the earbuds through the communication circuitry, based on identifying that the difference between the third data and the fourth data is within a preset range from the reference angle, display a screen, that is displayed through the display, with a first brightness, and based on identifying that the difference between the third data and the fourth data is outside of the preset range, display the screen with a second brightness lower than the first brightness.

What is claimed is:

1. An electronic device comprising:
    at least one memory storing instructions;
    at least one sensor;
    a display;
    a communication circuitry; and
    at least one processor operatively connected to the at least one memory, the at least one sensor, the display, and the communication circuitry,
    wherein the at least one processor is configured to execute the instructions to:
        when identifying whether at least one earbud is worn based on a preset signal received from the at least one earbud connected to the electronic device, receive a touch input contacted on the display;
        based on first data obtained through the at least one sensor when the touch input is received, identify that a variance of a posture of the electronic device is lower than a threshold value;
        based on identifying that the variance of the posture of the electronic device is lower than the threshold value when the touch input is received, transmit, to the at least one earbud through the communication circuitry, a signal to request second data about a posture of the at least one earbud;
        receive, from the at least one earbud through the communication circuitry, the second data;
        obtain a reference angle indicating a difference of the posture of the electronic device and the posture of the at least one earbud, based on a difference of the first data about the posture of the electronic device and the second data about the posture of the at least one earbud when the touch input is received;
        after obtaining the reference angle, identify a difference between third data about the posture of the electronic device, the third data being obtained through the at least one sensor, and fourth data about the posture of the at least one earbud received from the at least one earbud through the communication circuitry;

based on identifying that the difference between the third data and the fourth data is within a preset range from the reference angle, display a screen, through the display, with a first brightness; and based on identifying that the difference between the third data and the fourth data is outside of the preset range, display the screen with a second brightness different from the first brightness.

2. The electronic device of claim 1, wherein the at least one sensor comprises at least one of an acceleration sensor, a gyro sensor, and a geomagnetic sensor.

3. The electronic device of claim 1, wherein the at least one processor is further configured to execute the instructions to:

identify a strength of a signal comprising the fourth data;

identify that the strength of the identified signal is lower than a preset threshold value;

based on identifying that the strength of the identified signal is lower than the preset threshold value and based on identifying that the difference between the third data and the fourth data is within the preset range from the reference angle, bypass displaying the screen, which is displayed through the display, with the first brightness, and display the screen with the second brightness lower than the first brightness.

4. The electronic device of claim 3, wherein the at least one processor is further configured to execute the instructions to:

identify that a preset time is elapsed from a time instance identifying that the strength of the identified signal is lower than the preset threshold value;

based on identifying that a preset time is elapsed, turn off the display and set the electronic device as a lock state.

5. The electronic device of claim 1, wherein the at least one processor is further configured to execute the instructions to:

identify that a preset time is elapsed from a time instance displaying the screen with the second brightness lower than the first brightness;

based on identifying that a preset time is elapsed, turn off the display and set the electronic device as a lock state.

6. The electronic device of claim 1, wherein the at least one processor is further configured to execute the instructions to:

after obtaining the reference angle, identify that the touch input contacted on the display is received;

based on identifying that the touch input is received, calibrate the reference angle based on the first data obtained through the at least one sensor when the touch input is received and the second data about the posture of the at least one earbud.

7. The electronic device of claim 1, wherein the at least one processor is further configured to execute the instructions to:

identify that at least one application, that is being set to display the screen, which is displayed through the display, with the first brightness, is executed;

based on identifying that the at least one application is executed, bypass a calibration of the reference angle.

8. The electronic device of claim 1, wherein the at least one processor is further configured to execute the instructions to:

when a variance of the posture of the electronic device exceeds the threshold value, based on the first data, identify that a page orientation of the electronic device is changed.

9. The electronic device of claim 8, wherein the page orientation corresponds to at least one of a landscape mode and a portrait mode.

10. The electronic device of claim 9, wherein the at least one processor is further configured to execute the instructions to:

based on identifying that the page orientation is changed, transmit, to the at least one earbud through the communication circuitry, a signal to request second data about the posture of the at least one earbud.

11. An operation method of an electronic device comprising at least one memory configured to store instructions, at least one processor, at least one sensor, a display and a communication circuitry, comprising:

when identifying whether at least one earbud is worn based on a preset signal received from the at least one earbud connected to the electronic device, receiving a touch input contacted on the display;

based on first data obtained through the at least one sensor when the touch input is received, identifying that a variance of a posture of the electronic device is lower than a threshold value;

based on identifying that the variance of the posture of the electronic device is lower than the threshold value when the touch input is received, transmitting, to the at least one earbud through the communication circuitry, a signal to request second data about a posture of the at least one earbud;

receiving, through the communication circuitry from the at least one earbud, the second data;

obtaining a reference angle indicating a difference of the posture of the electronic device and the posture of the at least one earbud, based on a difference of the first data about the posture of the electronic device and the second data about the posture of the at least one earbud when the touch input is received;

after obtaining the reference angle, identifying a difference between third data about the posture of the electronic device, the third data being obtained through the at least one sensor, and fourth data about the posture of the at least one earbud received from the at least one earbud through the communication circuitry;

based on identifying that the difference between the third data and the fourth data is within a preset range from the reference angle, displaying a screen, that is displayed through the display, with a first brightness;

based on identifying that the difference between the third data and the fourth data is outside of the preset range, displaying the screen with a second brightness different from the first brightness.

12. The method of claim 11, wherein the at least one sensor comprises at least one of an acceleration sensor, a gyro sensor, and a geomagnetic sensor.

13. The method of claim 11, further comprises:

identifying a strength of a signal comprising the fourth data;

identifying that the strength of the identified signal is lower than a preset threshold value;

when the strength of the identified signal is lower than the preset threshold value, based on identifying that the difference between the third data and the fourth data is within the preset range from the reference angle, bypassing displaying the screen, which is displayed through the display, with the first brightness, and displaying the screen with the second brightness lower than the first brightness.

14. The method of claim 13, further comprises:

identifying that a preset time is elapsed from a time instance identifying that the strength of the identified signal is lower than the preset threshold value;

based on identifying that a preset time is elapsed, turning off the display and setting the electronic device as a lock state.

15. The method of claim 11, further comprises:

identifying that a preset time is elapsed from a time instance displaying the screen with the second brightness lower than the first brightness;

based on identifying that a preset time is elapsed, turning off the display and setting the electronic device as a lock state.

16. The method of claim 11, further comprises:

after obtaining the reference angle, identifying that the touch input contacted on the display is received;

based on identifying that the touch input is received, calibrating the reference angle based on the first data obtained through the at least one sensor when the touch input is received and the second data about the posture of the at least one earbud.

17. The method of claim 11, further comprises:

identifying that at least one application, that is being set to display the screen, which is displayed through the display, with the first brightness, is executed;

based on identifying that the at least one application is executed, bypassing a calibration of the reference angle.

18. The method of claim 11, further comprises:

when a variance of the posture of the electronic device exceeds the threshold value, based on the first data, identifying that a page orientation of the electronic device is changed.

19. The method of claim 18, wherein the page orientation is corresponding to one of a landscape mode and a portrait mode.

20. The method of claim 19, further comprises:

based on identifying that the page orientation is changed, transmitting, to the at least one earbud through the communication circuitry, a signal to request second data about the posture of the at least one earbud.

* * * * *